(12) United States Patent
Niu et al.

(10) Patent No.: US 12,557,125 B2
(45) Date of Patent: Feb. 17, 2026

(54) RESOURCE ALLOCATION FOR FEEDBACK CHANNELS IN SIDELINK COMMUNICATIONS

(71) Applicant: Apple Inc., Cupertino, CA (US)

(72) Inventors: Huaning Niu, San Jose, CA (US); Dawei Zhang, Saratoga, CA (US); Wei Zeng, Saratoga, CA (US); Weidong Yang, San Diego, CA (US); Yushu Zhang, Beijing (CN); Chunxuan Ye, San Diego, CA (US); Seyed Ali Akbar Fakoorian, San Diego, CA (US); Chunhai Yao, Beijing (CN); Oghenekome Oteri, San Diego, CA (US); Hong He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 18/137,200

(22) Filed: Apr. 20, 2023

(65) Prior Publication Data

US 2023/0354387 A1    Nov. 2, 2023

Related U.S. Application Data

(60) Provisional application No. 63/335,393, filed on Apr. 27, 2022.

(51) Int. Cl.
*H04W 72/40*   (2023.01)
*H04L 1/1812*   (2023.01)
*H04L 5/00*   (2006.01)

(52) U.S. Cl.
CPC .......... *H04W 72/40* (2023.01); *H04L 1/1812* (2013.01); *H04L 5/0016* (2013.01)

(58) Field of Classification Search
CPC ... H04W 72/40; H04W 72/25; H04W 72/569; H04W 4/40; H04L 1/1812; H04L 5/0016;
(Continued)

(56) References Cited

U.S. PATENT DOCUMENTS

2020/0288286 A1*   9/2020   Hwang ............... H04L 27/2607
2021/0091901 A1    3/2021   Sun et al.
(Continued)

FOREIGN PATENT DOCUMENTS

WO    WO 2021/189428 A1    9/2021
WO    WO 2021/232382 A1    11/2021
WO    WO_2022149904 A1 *   7/2022

OTHER PUBLICATIONS

International Search Report and Written Opinion for Application No. PCT/US2023/020006 mailed Aug. 17, 2023, 17 pages.

*Primary Examiner* — Rushil P. Sampat
(74) *Attorney, Agent, or Firm* — Sterne, Kessler, Goldstein & Fox P.L.L.C.

(57) ABSTRACT

Some aspects of this disclosure relate to apparatuses and methods for implementing resource allocations for feedback channels in sidelink communications. A UE can be configured to receive a physical sidelink control channel (PSCCH) transmission or a physical sidelink shared channel (PSSCH) transmission over a sidelink between the UE and a second UE for sidelink communication. The UE can allocate a set of resource elements within an interlace including multiple resource blocks to carry physical sidelink feedback channel (PSFCH) content associated with the received PSCCH transmission or PSSCH transmission, where the set of resource elements includes a first resource element in a first resource block of the interlace, and a second resource element in a second resource block of the interlace. The UE can be further configured to transmit the PSFCH content carried by the set of resource elements as a PSFCH transmission to the second UE.

17 Claims, 6 Drawing Sheets

(58) Field of Classification Search
CPC ... H04L 1/1848; H04L 1/1854; H04L 1/1861; H04L 1/1893; H04L 1/1896; H04L 5/0037; H04L 5/0053; H04L 5/0055; H04L 5/0094
See application file for complete search history.

(56) References Cited

U.S. PATENT DOCUMENTS

| | | | |
|---|---|---|---|
| 2022/0094472 A1* | 3/2022 | Hwang | ................ H04L 5/0082 |
| 2023/0069882 A1 | 3/2023 | Zhao | |
| 2024/0073929 A1* | 2/2024 | Park | ................ H04W 52/0219 |
| 2024/0276527 A1* | 8/2024 | Zhao | ................ H04W 72/0446 |
| 2025/0142591 A1* | 5/2025 | Yang | .................... H04W 72/25 |

* cited by examiner

RESOURCE ALLOCATION FOR FEEDBACK CHANNELS IN SIDELINK COMMUNICATIONS

CROSS REFERENCES

This application claims the benefit of U.S. Provisional Application No. 63/335,393 filed Apr. 27, 2022, titled "Resource allocation for feedback channels in sidelink communications," the content of which is herein incorporated by reference in its entirety.

BACKGROUND

Field

The described aspects generally relate to a wireless communication system including resource allocation for feedback channels in sidelink communications.

Related Art

A wireless communication system can include a fifth generation (5G) system, a New Radio (NR) system, a long term evolution (LTE) system, a 5G New Radio Unlicensed (NR-U) system, a combination thereof, or some other wireless systems developed by the Third Generation Partnership Project (3GPP). In addition, a wireless communication system can support a wide range of use cases such as enhanced mobile broad band (eMBB), massive machine type communications (mMTC), ultra-reliable and low-latency communications (URLLC), enhanced vehicle to anything communications (eV2X), among others.

In a wireless communication network or system, a user equipment (UE) communicates with a base station (for example, an evolved Node B (eNB), a next generation node B (gNB), or other base station). In addition, device-to-device (D2D) or sidelink communication among UEs is becoming more and more important for information exchange in wireless communication systems. Sidelink communication enables direct communication between proximate devices, e.g., multiple UEs, without going through the base station, leading to lower latency for communication among UEs. However, there are various issues to be resolved for sidelink communication among UEs in a wireless communication system.

SUMMARY

Some aspects of this disclosure relate to apparatuses and methods for implementing resource allocations for feedback channels for device-to-device (D2D) or sidelink communications among multiple user equipments (UEs) in wireless communication systems, e.g., a wireless communication system based on 3rd Generation Partnership Project (3GPP) release 16 (Rel-16), release 17 (Rel-17), or others. For example, systems and methods are provided implementing designs for New Radio (NR) wireless systems or New Radio Unlicensed (NR-U) systems.

Some aspects of this disclosure relate to a UE. The UE, which may be a receiver UE, includes a transceiver and a processor communicatively coupled to the transceiver. The transceiver can be configured to wirelessly communicate through an interface for sidelink communication over a sidelink between the UE and a second UE, where the second UE can be a transmission UE. In some embodiments, the sidelink communication can be carried over the sidelink between the UE and a second UE in an unlicensed frequency band. The processor can be configured to receive a physical sidelink control channel (PSCCH) transmission or a physical sidelink shared channel (PSSCH) transmission from the second UE. The processor can be further configured to allocate a set of resource elements within an interlace including multiple resource blocks to carry a physical sidelink feedback channel (PSFCH) content to the second UE. The set of resource elements can include a first resource element in a first resource block of the interlace, and a second resource element in a second resource block of the interlace. The processor can be further configured to transmit the PSFCH content carried by the set of resource elements as a PSFCH transmission to the second UE.

In some examples, the interlace can include at least 10 resource blocks including the first resource block and the second resource block, and the set of resource elements includes at least one resource element in each of the 10 resource blocks to carry the PSFCH content to the second UE. In some examples, the PSCCH transmission or the PSSCH transmission can be fully contained within the interlace. In some embodiments, the interlace is dedicated to the PSCCH transmission or the PSSCH transmission. In some examples, the interlace can be a first interlace, and the PSCCH transmission or the PSSCH transmission can include a resource element of the first interlace, and further include a second interlace, and the second interlace does not include a PSFCH content.

In some examples, the first resource element can be composed of a first symbol of the first resource block, and the set of resource elements can further include a third resource element of the first resource block, and the third resource element can be composed of a second symbol adjacent to the first symbol. In some embodiments, the first resource element can be composed of a first symbol of the first resource block, and the first resource block further includes a gap symbol adjacent to the first symbol, where the gap symbol is used for Clear Channel Assessment (CCA) of an unlicensed frequency band.

In some examples, the second resource element in the second resource block can be obtained by performing a cyclic shift of the first resource element in the first resource block. The second resource element in the second resource block can be obtained by applying an orthogonal cover code (OCC) to the first resource element in the first resource block, where the OCC can include a frequency domain OCC, a time domain OCC, or a pre-discrete Fourier transform (DFT) OCC.

In some examples, the set of resource elements can include one or more resource elements to multiplex PSFCH contents from multiple sidelinks between multiple UEs including the UE and the second UE. The PSFCH content can include a hybrid automatic repeat request (HARQ) symbol associated with the PSCCH transmission or the PSSCH transmission. In some examples, the HARQ symbol can include a unicast HARQ Ack, a groupcast HARQ Ack, or a groupcast HARQ NACK only.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
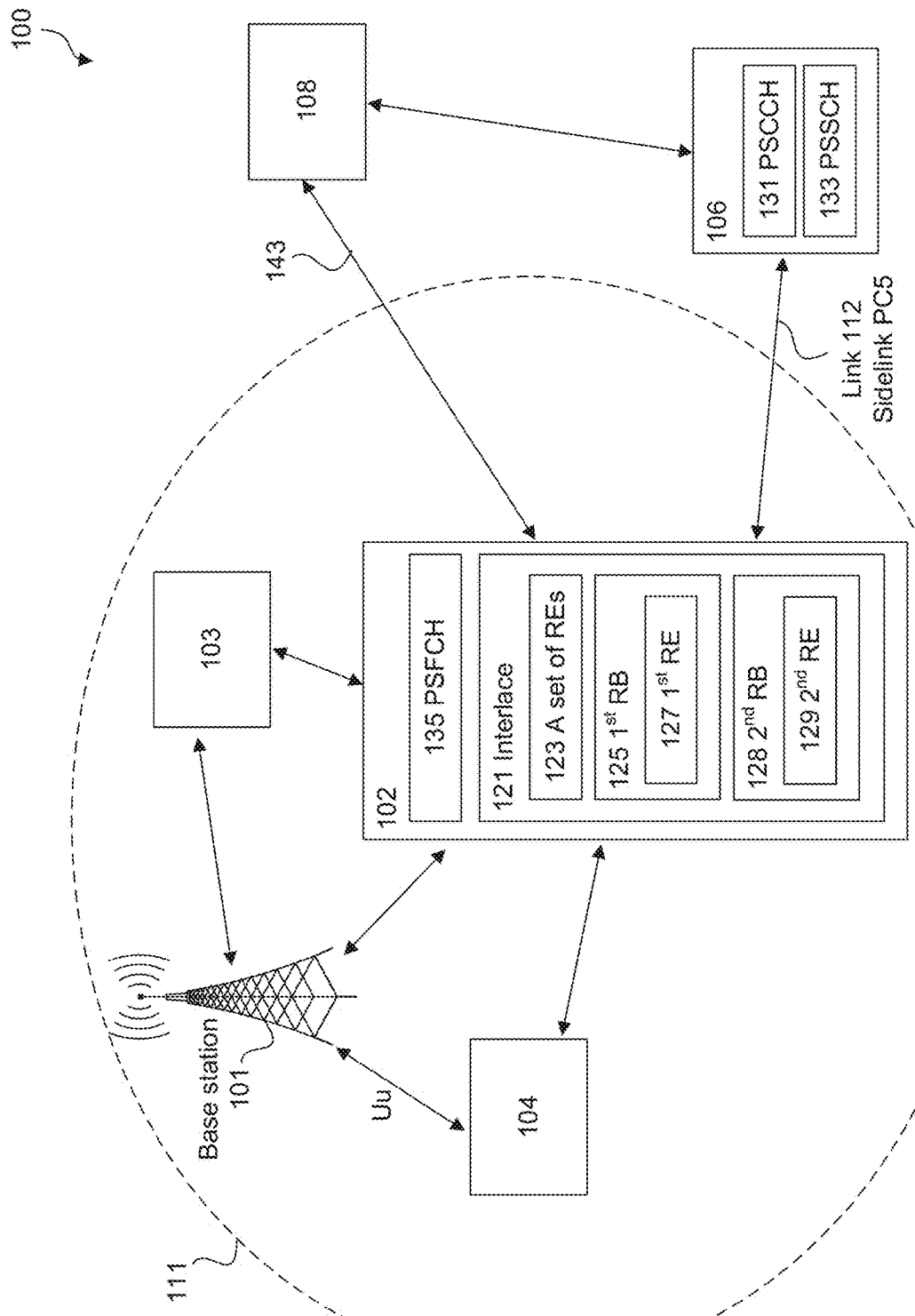
FIG. 1 illustrates an example wireless system implementing resource allocations for feedback channels for sidelink communications among multiple user equipments (UEs), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, a user equipment (UE) can communicate via uplink and downlink with a base station (for example, an evolved Node B (eNB), a next generation node B (gNB), or other base station) in a wireless communication network or system. In addition, a UE can communicate with one or more UEs directly by device-to-device (D2D) or sidelink (SL) communication through sidelink channels. Various sidelink channels are defined in an interface for sidelink communication, e.g., Physical Sidelink Control Channel (PSCCH) and physical sidelink shared channel (PSSCH) in a PC5 interface. Compared to the conventional cellular communication, sidelink communication can have many advantages, e.g., more efficient and transparent to achieve higher spectral efficiency and low latency. Other terms have been used to describe SL related communication systems, e.g., proximity service (ProSe) communication, D2D communication. Even though those terms, e.g., SL communication, D2D communication, ProSe communication, can differ from each other in some aspects, they are used interchangeably in the current disclosure. Sidelink communication can operate using both licensed cellular spectrum (known as in-band communication) and unlicensed spectrum (known as out-band communication).

However, since sidelink communication between multiple UEs were initially designed for public safety relying on broadcasting transmissions, there was no feedback channel for a receiving UE to provide feedback information (e.g., the decoding status and channel state information) to a transmitting UE. A receiving UE can be referred to as a receiver UE and a transmitting UE can be referred to as a transmission UE as well. Some recent technology for sidelink communication may implement feedback channels with limited capabilities, such as limiting the content for the feedback to include only hybrid automatic repeat request (HARD) acknowledgement (ACK) and the negative ACK (NACK) (ACK/NACK) bits carried only by a single resource block.

Some aspects of this disclosure provide mechanisms for implementing resource allocations for feedback channels for sidelink communications among multiple UEs. In some examples, the mechanisms can be applicable to feedback channels for sidelink communications in unlicensed frequency bands. Instead of being limited to a single resource block with limited feedback content, embodiments herein present techniques for allocating a set of resource elements within an interlace including multiple resource blocks (RBs) to carry physical sidelink feedback channel (PSFCH) content, so that the set of resource elements can include a first resource element (RE) in a first resource block of the interlace, and a second resource element in a second resource block of the interlace. The use of interlace including multiple resource blocks instead of a single resource block can provide many advantages such as enabling multiple UEs to multiplex PSFCH contents over the same interlace.

According to some aspects, a UE can receive a PSCCH transmission or a PSSCH transmission from a second UE, sometimes over an unlicensed frequency band. The UE can allocate a set of resource elements within an interlace including multiple resource blocks to carry physical sidelink feedback channel (PSFCH) content to the second UE. The set of resource elements can include a first RE in a first RB of the interlace, and a second RE in a second RB of the interlace. Various relationship can exist between the first RE and the second RE, as illustrated in the current disclosure.

The UEs disclosed herein can operate in a wireless communication system based on 3rd Generation Partnership Project (3GPP) release 16 (Rel-16), release 17 (Rel-17), a New Radio (NR) system, or a New Radio Unlicensed (NR-U) system. However, these 3GPP release versions are not meant to be limiting. Although some examples of the contents of SL communication among multiple UEs are provided above, the aspects of this disclosure are not limited to these examples and SL communication among multiple UEs can include less, more, or other parameters, instructions, and/or information.

FIG. 1 illustrates an example wireless system 100 implementing resource allocations for feedback channels for sidelink communications among multiple UEs, according to some aspects of the disclosure. Wireless system 100 is provided for the purpose of illustration only and does not limit the disclosed aspects. Wireless system 100 can include, but is not limited to, a base station 101 and multiple UEs, e.g., a UE 102, a UE 103, a UE 104, a UE 106, a UE 108.

According to some aspects, base station 101 can include a node configured to operate based on a wide variety of wireless communication techniques such as, but not limited to, techniques based on 3GPP standards. For example, base station 101 can include a node configured to operate using Rel-16, Rel-17, or others. Base station 101 can be a fixed station, and may also be called a base transceiver system (BTS), an access point (AP), a transmission/reception point (TRP), an evolved NodeB (eNB), a next generation node B (gNB), or some other equivalent terminology. Wireless system 100 can operate using both licensed cellular spectrum (known as in-band communication) and unlicensed spectrum (known as out-band communication).

According to some aspects, a UE, e.g., UE 102, UE 103, UE 104, UE 106, or UE 108, can be configured to operate based on a wide variety of wireless communication techniques. These techniques can include, but are not limited to, techniques based on 3GPP standards. For example, referring to FIG. 1, the UE 102 can be configured to operate using Rel-16, Rel-17 or later. UE 102, UE 103, UE 104, UE 106, or UE 108, can include, but is not limited to, a wireless communication device, a smart phone, a laptop, a desktop, a tablet, a personal assistant, a monitor, a television, a wearable device, an Internet of Things (IoTs), a vehicle's communication device, a mobile station, a subscriber station, a remote terminal, a wireless terminal, a user device, or the like.

In some aspects, wireless system 100 may operate over a system bandwidth (BW) or a component carrier (CC) BW. Wireless system 100 may partition the system BW into multiple BWPs (e.g., portions). Base station 101 may dynamically assign UE 102 to operate over a certain BWP. Base station 101 may schedule UE 102 for UL or DL communications in the assigned BWP. In some embodiments, wireless system 100 may operate over a shared channel, which may include shared frequency bands or unlicensed frequency bands. For example, wireless system 100 may be an NR-unlicensed (NR-U) network operating over an unlicensed frequency band. In such an aspect, to avoid collisions, base station 101 and UE 102 may employ a listen-before-talk (LBT) procedure to monitor for transmission opportunities in the shared channel. For example, a transmitting node, such as base station 101 or UE 102, may perform an LBT procedure prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection.

According to some aspects, base station 101 communicates with the multiple UEs within a coverage area 111, e.g., UE 102, UE 104, UE 103, while UE 106 and UE 108 are outside the coverage area 111. Among them, UE 103 is a relay UE. A UE within the coverage area 111, e.g., UE 102, communicates with the base station 101 in uplink (UL) and downlink (DL) through a communication interface, e.g., a Uu interface.

According to some aspects, a UE can perform SL communication with another UE without tunneling through base station 101 and/or the core network. For example, UE 102 can perform SL communication with UE 104, UE 106, and UE 108. UE 104 is an in-coverage UE with respect to UE 102 and base station 101 since both UE 102 and UE 104 are within coverage area 111 of base station 101. UE 106 is a partial-coverage UE with respect to UE 102 and base station 101 since UE 106 is outside coverage area 111 but UE 102 is within coverage area 111, and UE 106 operates a link 112 with UE 102. Similarly, UE 108 is a partial-coverage UE with respect to UE 102 and base station 101 since UE 108 is outside coverage area 111 but UE 102 is within coverage area 111, and UE 108 operates a link 143 with UE 102. Furthermore, UE 106 can perform SL communication with UE 108, where both UE 106 and UE 108 are an out-of-coverage UE since both UE 106 and UE 108 are out of coverage area 111 of base station 101.

In some embodiments, a UE, such as UE 102, UE 106, or UE 108, can perform SL communication with another UE using an interlaced based scheme, where an interlace can include multiple resource blocks (RBs). A resource block may be referred to as a physical resource block (PRB) as well. According to some aspects, interlace based scheme for sidelink communication can improve the communication efficiency to meet certain BW occupancy requirements and/or a maximum allowable power spectral density (PSD).

According to some aspects, a UE can perform SL communication with another UE over a SL link through an interface, e.g., PC5 interface, which is different from the interface between the UE and the base station. The interface for SL communication between UEs can support one-to-many and/or any-to-any communication between a group of UEs. For example, UE 102 and UE 106 can communicate over link 112 through the PC5 interface. A message can be sent from UE 102 to UE 106 using SL communication by a broadcast transmission, a groupcast transmission, or a unicast transmission.

According to some aspects, a UE can perform SL communication with another UE for various applications. For example, UE 102 can perform SL communication with UE 106 for public safety use or commercial application, to provide a data offloading facility that can reduce the overall network overhead, for indoor installation and positioning, for machine type communication (MTC), or more. UE 102 can perform vehicle-to-vehicle (V2V) communication and vehicle-to-everything (V2X) communication with UE 106 by SL communication. For example, UE 102 and UE 106 can be two vehicles. UE 102 can be a vehicle running at high speed that warns UE 106, which is a nearby vehicle, using link 112 before it changes highway lanes.

Figure 2:
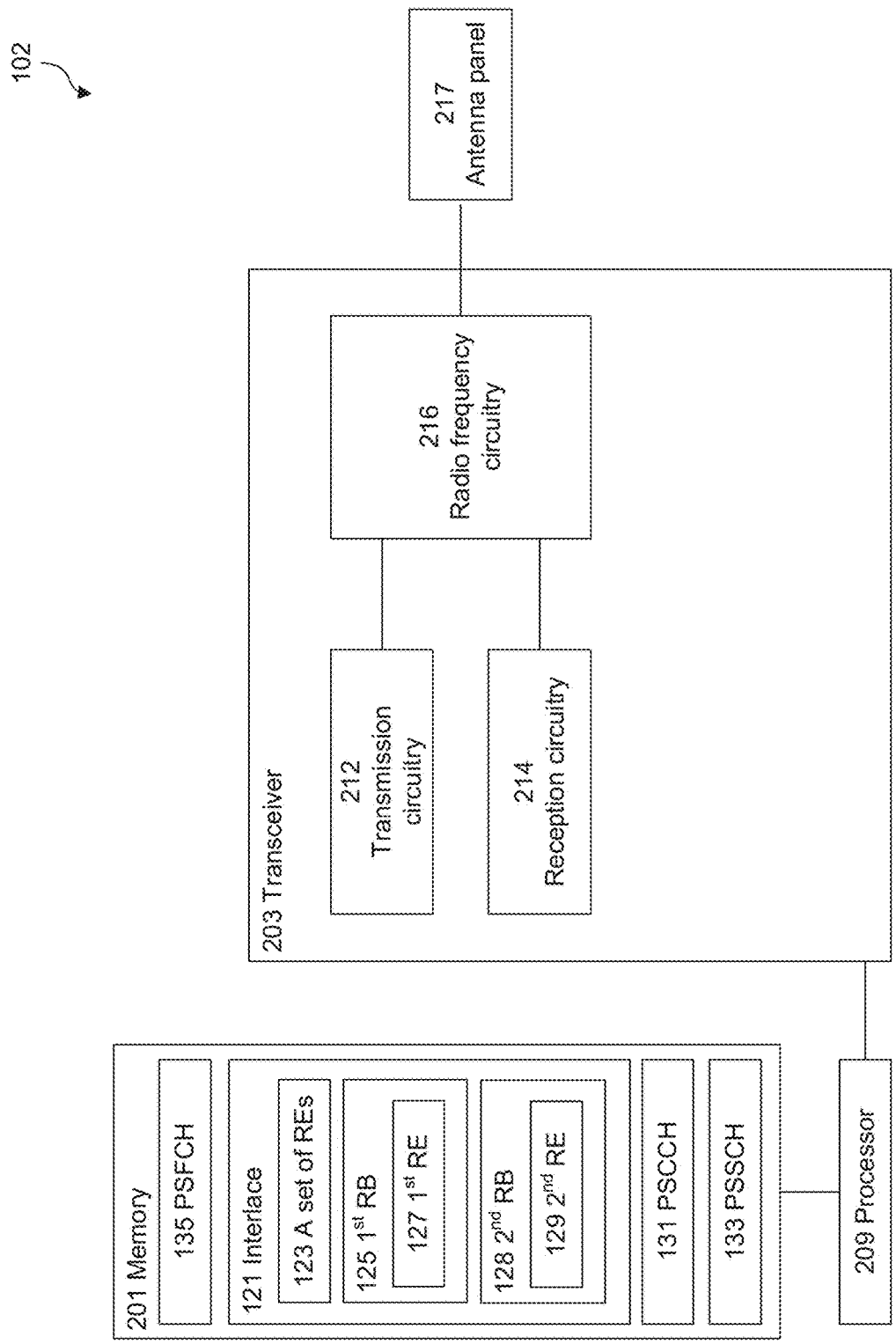
FIG. 2 illustrates a block diagram of a UE including a transceiver and a processor, according to some aspects of the disclosure.

According to some aspects, UE 102, or other UEs, can be implemented according to a block diagram as illustrated in FIG. 2. Referring to FIG. 2, UE 102 can have antenna panel 217 including one or more antenna elements to form various transmission beams, e.g., transmission beam 213, coupled to a transceiver 203 and controlled by a processor 209. Transceiver 203 and antenna panel 217 (using transmission beam 213) can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203. Various data can be stored in memory 201.

In some examples, memory 201 can store a PSCCH transmission 131 or a PSSCH transmission 133 received from UE 106. In addition, processor 209 can generate a physical sidelink feedback channel (PSFCH) content 135 associated with the received PSCCH transmission 131 or the received PSSCH transmission 133, and allocate a set of REs 123 within an interlace 121 including multiple resource blocks to carry the PSFCH content 135 to UE 106. The set of REs 123 can include a first resource element 127 in a first RB 125 of interlace 121, and a second RE 129 in a second RB 128 of interlace 121. Processor 209 can further transmit PSFCH content 135 carried by the set of REs 123 as a PSFCH transmission to UE 106.

Based on the discussion herein, it will apparent that the other UEs 103, 104, 106, and 108 in FIG. 1 can have a same or similar structure to that described for UE 102 in FIG. 2.

In some embodiments, memory 201 can store instructions, that when executed by processor 209 perform or cause to perform operations described herein, e.g., operations to perform resource allocations for feedback channels for sidelink communications among multiple UEs. Alternatively, processor 209 can be "hard-coded" to perform the operations described herein. In some embodiments, processor 209 can be configured to perform operations described in process 310 in FIG. 3 performed by UE 102, as will be understood by one skilled in the art.

Figure 3:
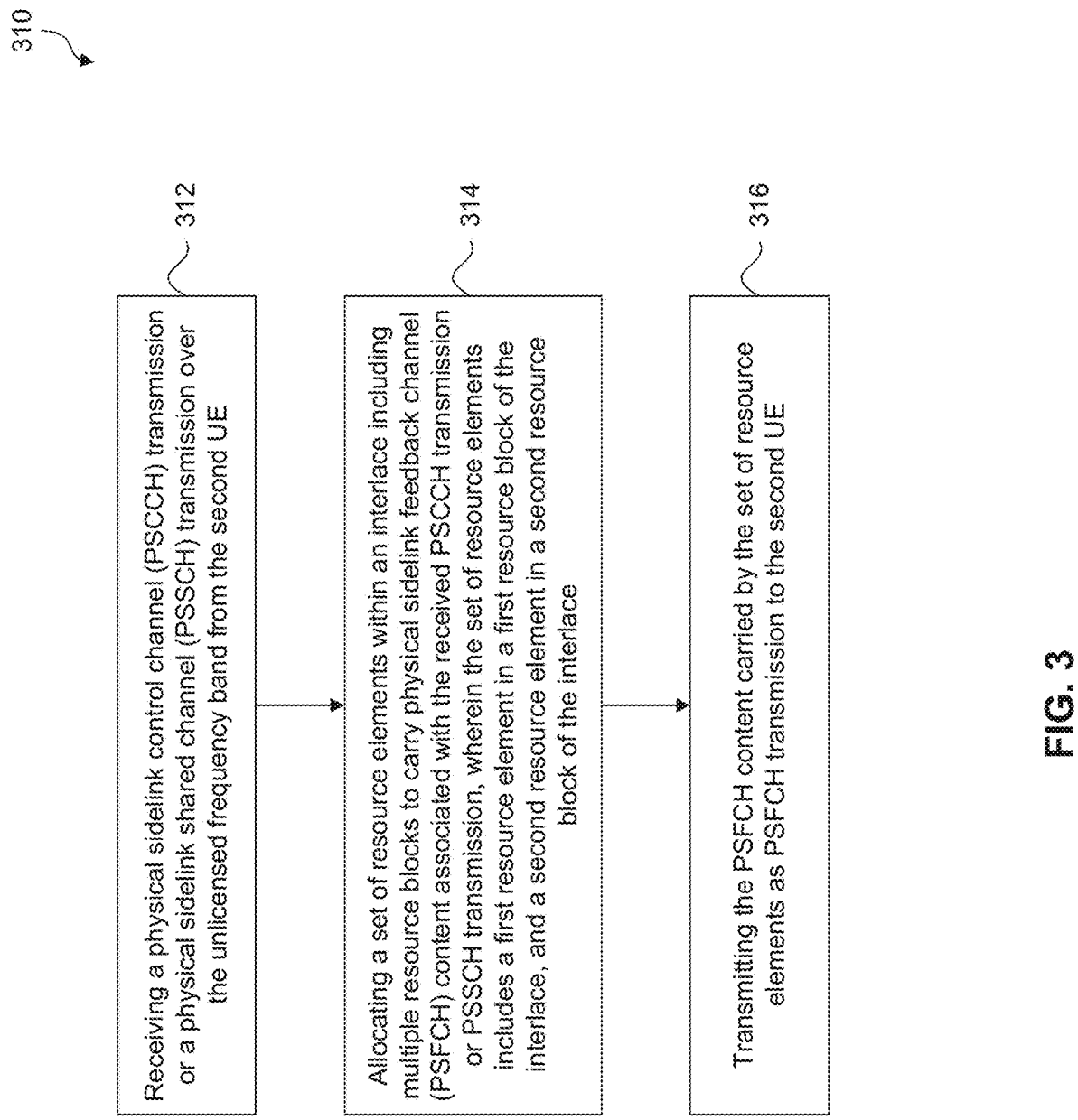
FIG. 3 illustrates example processes performed by a UE for implementing resource allocations for feedback channels for sidelink communications, according to some aspects of the disclosure.

FIG. 3 illustrates example process 310 performed by a UE for implementing resource allocations for feedback channels in sidelink communications, according to some aspects of the disclosure. Process 310 can be performed by UE 102, UE 104, UE 106, or UE 108, which may be implemented as shown in FIG. 2. Process 310 may also be performed by a computer system 500 of FIG. 5. Process 310 is not limited to the specific aspects depicted in those figures and other systems may be used to perform the method as will be understood by those skilled in the art. It is to be appreciated that not all operations may be needed, and the operations may not be performed in the same order as shown in process 310. Process 310 describes operations performed by UE 102 when UE 102 functions as a receiver UE, where data communication is transmitted from a transmission UE, e.g., UE 106 to a receiver UE such as UE 102.

At 312, processor 209 can receive PSCCH transmission 131 or PSSCH transmission 133 from a second UE, e.g., UE 106. In some embodiments, the sidelink communication is carried over sidelink 112 between UE 102 and UE 106 in an unlicensed frequency band.

At 314, processor 209 can allocate, within interlace 123, the set of resource elements 123 including multiple resource blocks to carry PSFCH content 135 associated with the received PSCCH transmission 131 or PSSCH transmission 133. PSFCH content 135 can include a HARQ symbol associated with PSCCH transmission 131 or PSSCH transmission 133. In some examples, the HARQ symbol can include a unicast HARQ Ack, a groupcast HARQ Ack, or a groupcast HARQ NACK only. The set of REs 123 can include the first RE 127 in the first RB 125, and the second RE 129 in the second RB 128 of interlace 121. More details of interlace 401 are shown in FIG. 4.

At 316, processor 209 can transmit PSFCH content 135 carried by the set of REs 123 as a PSFCH transmission to UE 106. In some embodiments, the set of REs 123 can further include one or more REs to multiplex PSFCH contents from multiple sidelinks between multiple UEs including UE 102 and UE 106. For example, the set of REs 123 can further include one or more REs for PSFCH contents for sidelink 143 between UE 102 and UE 108.

Figure 4A:
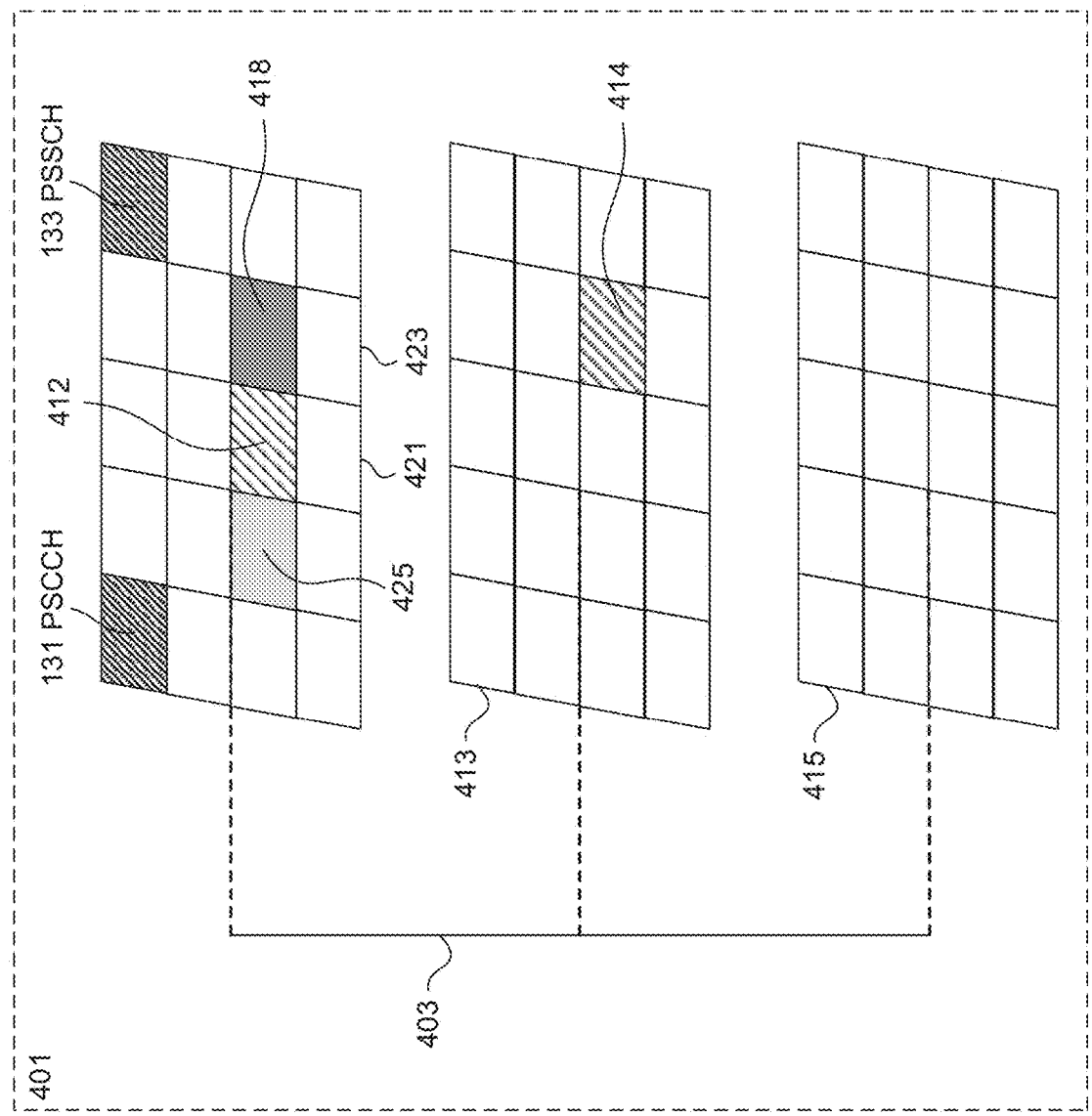
FIGS. 4A-4B illustrate example resource allocations of an interlace including multiple resource blocks by a UE for implementing resource allocations for feedback channels in sidelink communications, according to some aspects of the disclosure.
Figure 4B:
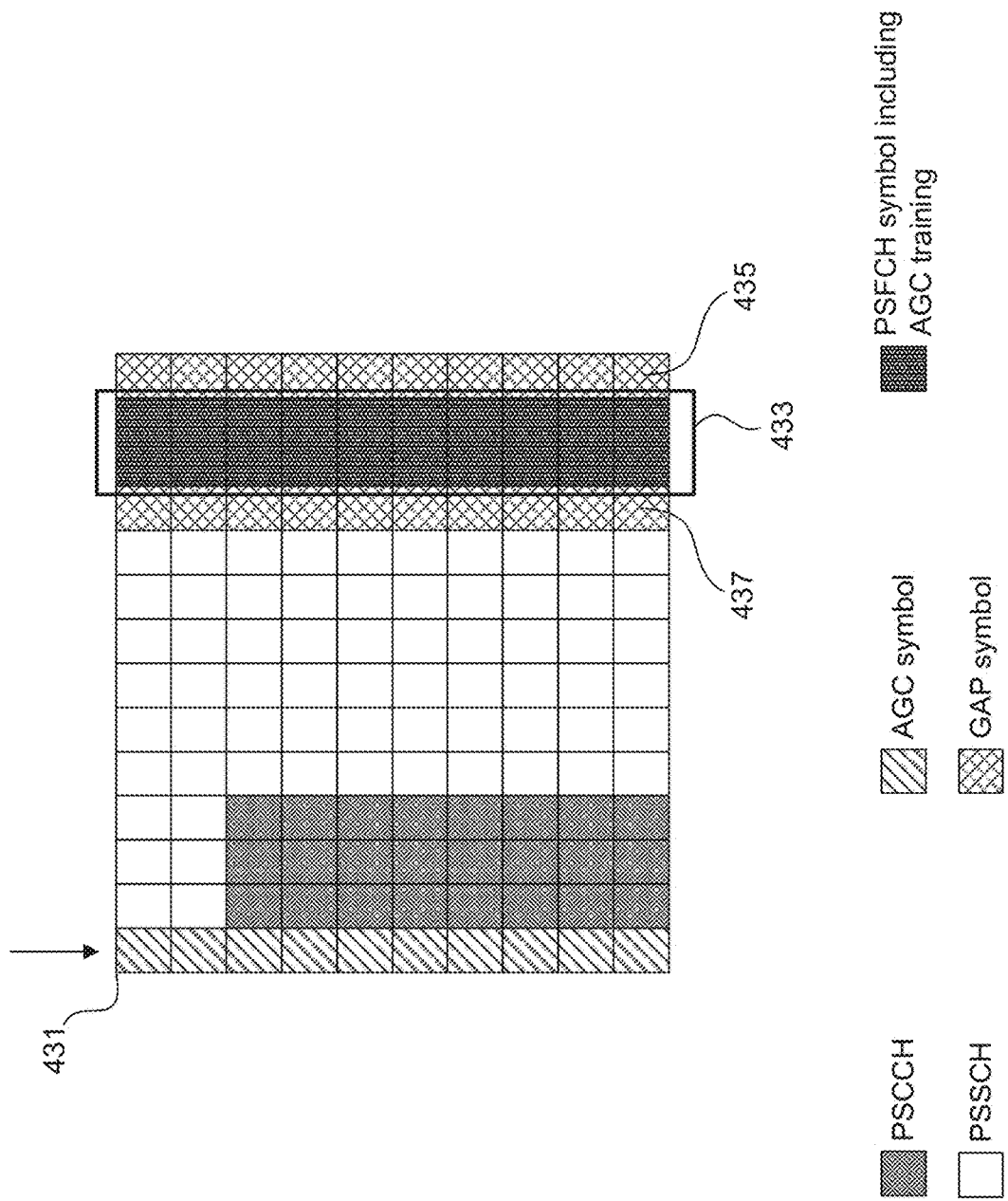

FIGS. 4A-4B illustrate example resource allocations of an interlace, e.g., interlace 401, including multiple RBs by a UE for implementing feedback channels for sidelink communications, according to some aspects of the disclosure. Resource allocation on interlace 401 can be performed by UE 102 according to process 310 as shown in FIGS. 1-3, where interlace 401 can be an example of interlace 121.

In some embodiments, as shown in FIG. 4A, interlace 401 can include at least two resource blocks, such as RB 411, RB 413, or an additional RB 415 or more. UE 102 can allocate a set of REs within interlace 401, such as the set of REs 123 to carry PSFCH content 135 associated with the received PSCCH transmission 131 or PSSCH transmission 133. The set of REs 123 can include a first RE 412 in RB 411, and a second RE 414 in RB 413. An RE is composed of a subcarrier within an OFDM symbol. In some embodiments, an RB is composed of 12 consecutive subcarriers with the same Subcarrier Spacing (SCS), and thus the bandwidth of an RB depends on the SCS value of subcarriers.

In some embodiments, interlace 401 can include at least 10 RBs, and the set of REs 123 can include at least one RE in each of the 10 RBs to carry PSFCH content 135. RB 411, RB 413, RB 415, and other RBs of interface 401 can be evenly spaced over a frequency band 403. In some embodiments, frequency band 403 can be an unlicensed frequency band. There can be other RBs between RB 411 and RB 413, which are not shown. In some embodiments, RB 411, RB 413, RE 412, RE 414 are shown for examples only, and are not limited to the number of REs or RBs as shown. For example, there are only 5 symbols are shown for RB 411, which is only for illustration purpose. The actual number of symbols within a RB can be more than 5.

In some embodiments, the first RE 412 is composed of a first symbol 421 of the first RB 411, and the set of REs 123 can further include a third RE 418, and the third RE 418 is composed of a second symbol 423 adjacent to the first symbol 421.

In some embodiments, the first RB 411 can further include a gap symbol 425 adjacent to the first symbol 421. In some embodiments, gap symbol 425 can be used for Clear Channel Assessment (CCA) of the unlicensed frequency band, where gap symbol 425 used for CCA is to perform the LBT procedure.

In some embodiments, a gap symbol for CCA can be before symbol 421 for the first RE 412 in the set of REs 123 allocated to carry PSFCH content 135. The position for gap symbol 425 used for CCA to transmit the PSFCH content can be signaled in PSCCH transmission 131. In some embodiments, only type 2A, 2B and 2C CCA is supported for transmitting PSFCH content 135. In some examples, cyclic prefix (CP) extension used to fill in the gap symbol for CCA can potentially be used for automatic gain control (AGC). For example, with a 16 μs gap symbol, a transmission/receiving (Tx/Rx) switching can be included in the 16 μs gap. With a 15 KHz subcarrier spacing (SCS), roughly 55 μs CP extension can be used for additional AGC.

In some embodiments, a gap symbol for CCA can be after the symbol for the RE in the set of REs 123 allocated to carry the PSFCH content. When only one symbol is used as the gap symbol, based on initiating device (transmission UE) channel occupancy time (COT) sharing, initiating device can have the remaining COT to transmit additional PSCCH/PSSCH, the initiating device may add CP extension to fill in the gap. In some other embodiments, the responding device (receiver UE) can add post extension to fill in the gap to 16 μs or 25 μs, and can further have repetition for 2 symbols. In some embodiments, for type 1 CCA for PSFCH that have longer than 1 OFDM symbol, the gap symbols may include at least two OFDM symbols for the gap.

In some embodiments, the second RE 414 in the second RB 413 can be obtained by performing a cyclic shift of the first RE 412 in the first RB 411. For example, the second RE 414 in the second RB 413 can be obtained by applying an orthogonal cover code (OCC) to the first RE 412 in the first RB 411, where the OCC can include a frequency domain OCC (FD-OCC), a time domain OCC, or a pre-discrete Fourier transform (DFT) OCC.

In some embodiments, when interlace 401 includes multiple RBs, UE 102 can use cycling of cyclic shifts (CS) across multiple RBs on the interlace. A short sequence of length 12 will be applied per RB. The sequence will be applied with additional cyclic shift across the 10 RBs within an interlace. The cyclic shift value is determined by the RB separation within an interlace, also the RB index within an interlace. For example, with 15 KHz SCS, two adjacent RBs within one interlace are separated by 10 RBs. With 30 KHz SCS, two adjacent RBs within one interlace are separated by 5 RBs.

In some embodiments, when there are at least 2 bits of feedback bits for PSFCH content 135, UE 102 can use frequency domain orthogonal cover code (FD-OCC) length of 1, 2, and 4 to multiple users on both 1 symbol or 2 symbol PUCCH format 2 (PF2). The set of REs 123 can be applied to both Uplink Control Information (UCI) RE and demodulation reference signal (DMRS) RE. When FD OCC-2 is used within one RB of each interlace, the two adjacent DMRS REs will apply one FD OCC, the two adjacent data REs will apply one FD OCC-2. The same FD OCC-2 will be used in all 10 RBs of the interlace, or different RB use different OCC within the interlace. Different FD OCC will be assigned to different UEs. For example, OCC sequence 1 is used by UE1, and OCC sequence 2 is used by UE2. When FD OCC-4 is used within one RB of each interlace, the four adjacent DMRS REs will apply one FD OCC-4 code, the four adjacent data REs will apply one FD OCC-4 code. The same FD OCC-4 will be used in all 10 RBs of the interlace, or different RB use different OCC within the interlace. Different FD OCC will be assigned to different UEs. For example, OCC sequence 1 is used by UE1, OCC sequence 2 is used by UE2, OCC sequence 3 is used by UE3. and OCC sequence 4 is used by UE4.

In some embodiments, when there are at least 2 bits of feedback bits for PSFCH content 135, UE 102 can use pre-DFT OCC to map into REs within each interlace. In this option, more number of symbols, e.g. >=4 symbols, may be used for the PSFCH content 135.

In some embodiments, when there are at least 3 bits of feedback bits for the PSFCH content 135, UE 102 can use Medium Access Control (MAC) Control Element (MAC CE) to report, which is carried by PSSCH.

In some embodiments, at time domain, there can be repetition for 2 symbols to allocate REs for the set of REs 123 allocated to carry the PSFCH content in each RB of interlace 401, where the 1st symbol can be used for AGC. In some other embodiments, there can be time domain OCC over 2 OFDM symbols allocated for REs for the set of REs 123 allocated to carry the PSFCH content.

In some embodiments, PSFCH content 135 can include a HARQ symbol associated with PSCCH transmission 131 or PSSCH transmission 133. In some examples, the HARQ symbol can include a unicast HARQ ACK/NACK, a groupcast HARQ ACK/NACK, or a groupcast HARQ NACK only. In some embodiments, PSFCH content 135 transmitted by a sidelink receiving UE for unicast and groupcast, which conveys 1 bit information over 1 RB for the HARQ ACK and NACK. In addition, channel state information (CSI) is carried in the medium access control (MAC) control element (CE) over the PSSCH instead of the PSFCH. In some embodiments, such as in V2X, each receiver UE can use a single PSFCH (per RB), while different UEs can be multiplexed per interlace for unicast and group cast ACK/NACK feedback. In some embodiments, for unicast HARQ ACK/NACK, different cyclic shift per UE can be used. In some other embodiments, for unicast HARQ ACK/NACK, FD-OCC or pre-DFT OCC are used per UE to multiplex. In some embodiments, for group cast HARQ NACK only, one common interlace with same CS or OCC can be selected.

In some embodiments, PSFCH content 135 is associated with PSCCH transmission 131 or PSSCH transmission 133. PSFCH transmission 135 can be fully contained within interlace 401. In addition, in some embodiments, interlace 401 can be fully dedicated to PSFCH content 135 alone and become a dedicated interlace, and each PSFCH is decodable based on the received information within the dedicated interlace. Similarly, interlace 401 can be fully dedicated to PSSCH transmission 133 alone without transmit other information for other transmissions. In some embodiments, interlace 401 can be a first interlace, and PSCCH transmission 131 or PSSCH transmission 133 can further include a second interlace, not shown, and the second interlace does not include a PSFCH content.

In some embodiments, if PSCCH transmission 131 or PSSCH transmission 133 is in one interlace, the REs for transmitting PSFCH content 135 can be in the same interlace, and the PSFCH indexing can be based on CS, OCC depends on options.

In some embodiments, if PSCCH transmission 131 or PSSCH transmission 133 has more than one interlaces, the REs for transmitting PSFCH content 135 can take one interlace of the more than one interlaces. The number of PSFCH can be indexed by interlace index, then per CS, OCC.

In some embodiments, when PSFCH content 135 includes multiple HARQ bits for Multiple Transmit Time Interval (multi-TTI) PSSCH, there can be various implementations. In some embodiments, when multiple CS are selected per HARQ bit, different $M\_\{cs\}$ can be used to carry information: e.g. the first half interlace uses $m\_\{cs\}$=HARQ-bit 1, the second half interlace uses $m\_\{cs\}$=HARQ-bit 2. Additionally and alternatively, the first sub-interface can be used to carry HARQ bit-1, the second sub-interlace for HARQ bit-2. First sub-interlace would take PRBs 1, 3, 5, . . . from the PRBs in the interlace, second sub-interlace from PRBs 2, 4, 6, . . . from the PRBs in the interlace etc.

In some embodiments, when OCC are used, if UCI includes CSI and HARQ-ACK/SR, for the interlace structure HARQ-ACK/SR can be mapped to some interlace index and CSI can be mapped to another interlace index. Alternatively, HARQ-ACK/SR is encoded and mapped to some RB (e.g. 1st RB) and CSI is encoded and mapped to the rest of RBs within the indicated interlace index. In some other embodiments, the maximum number of PSSCH TBs for feedback can be defined or indicated by the transmission UE, e.g., UE 106, then UE 102 can reserve the related PFSCH resources. Multiple transport blocks (TBs) HARQ-ACK bit mapping to PFSCH resource can be defined. NACK-only based feedback if configured falls back to NACK based feedback.

In some embodiments, as shown in FIG. 4B, a RB 431 is shown with more details within a slot. An RB is composed of 12 consecutive subcarriers with the same SCS, and thus the bandwidth of an RB depends on the SCS value of subcarriers. A slot is composed of 14 OFDM symbols in the case of normal cyclic prefix (NCP) and is composed of 12 OFDM symbols in the case of extended cyclic prefix (ECP). Therefore, the length of a slot depends on the adopted SCS value. For the 15 kHz SCS, the length of a slot is 1 ms, which is exactly the length of a subframe. For 30 kHz, 60 kHz, and 120 kHz SCSs, the lengths of a slot are 0.5 ms, 0.25 ms, and 0.125 ms, respectively. In some other embodiments, different numbers of REs can be contained in a RB accordingly to various communication standards.

In some embodiments, RB 431 can be an example of RB 411, RB 413, or RB 415. In time domain, the REs for the set of REs 123 allocated to carry the PSFCH content 135 can include at least two consecutive symbols 433, which is a repetition of PSFCH format, where the first symbol can be used for AGC training. One symbol 437 can be used for gap symbol for Tx/Rx switch before and one symbol 435 can be used for gap symbol after the REs for the set of REs 123 allocated to carry the PSFCH content 135.

Figure 5:
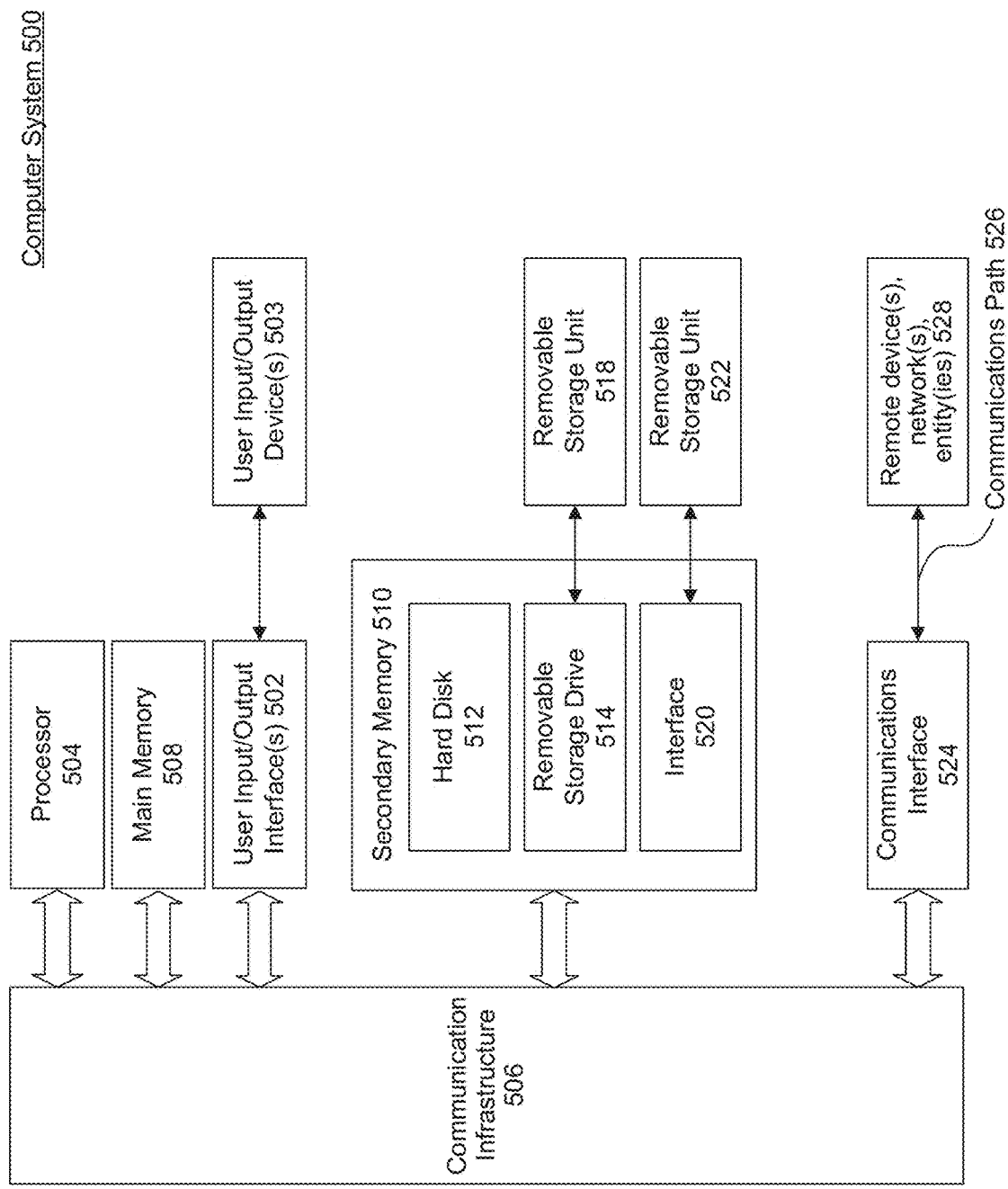
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the functions described herein such as UE 102, or base station 101 as shown in FIG. 1 and FIG. 2, for operations described for processor 209 or process 310 as illustrated in FIGS. 3, 4A-4B. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 102, or base station 101 as shown in FIG. 1 and FIG. 2. In some examples, the operations include those operations illustrated and described for process 310 as illustrated in FIGS. 3, 4A-4B.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication through an interface for sidelink communication over a sidelink between the UE and a second UE; and
a processor communicatively coupled to the transceiver and configured to:
receive a physical sidelink control channel (PSCCH) transmission or a physical sidelink shared channel (PSSCH) transmission from the second UE;
allocate a set of resource elements within an interlace including multiple resource blocks to carry physical sidelink feedback channel (PSFCH) content associated with the received PSCCH transmission or PSSCH transmission, wherein the set of resource elements includes a first resource element in a first resource block of the interlace, and a second resource element in a second resource block of the interlace, wherein the first resource element is composed of a first symbol of the first resource block, the first resource block further includes a gap symbol adjacent to the first symbol, and the gap symbol is used for Clear Channel Assessment (CCA) of an unlicensed frequency band; and
transmit the PSFCH content carried by the set of resource elements as a PSFCH transmission to the second UE.

2. The UE of claim 1, wherein the first resource element is composed of the first symbol of the first resource block, and the set of resource elements further includes a third resource element of the first resource block, and the third resource element is composed of a second symbol adjacent to the first symbol.

3. The UE of claim 1, wherein the interlace comprises at least 10 resource blocks including the first resource block and the second resource block, and the set of resource elements includes at least one resource element in each of the 10 resource blocks to carry the PSFCH content to the second UE.

4. The UE of claim 1, wherein the second resource element in the second resource block is obtained by performing a cyclic shift of the first resource element in the first resource block.

5. The UE of claim 1, wherein the second resource element in the second resource block is obtained by applying an orthogonal cover code (OCC) to the first resource element in the first resource block.

6. The UE of claim 5, wherein the OCC includes a frequency domain OCC, a time domain OCC, or a pre-discrete Fourier transform (DFT) OCC.

7. The UE of claim 1, wherein the set of resource elements includes one or more resource elements to multiplex PSFCH contents from multiple sidelinks between multiple UEs including the UE and the second UE.

8. The UE of claim 1, wherein the PSFCH content includes a HARQ symbol associated with the PSCCH transmission or the PSSCH transmission.

9. The UE of claim 8, wherein the HARQ symbol includes a unicast HARQ Ack, a groupcast HARQ Ack, or a groupcast HARQ NACK only.

10. The UE of claim 1, wherein the PSFCH transmission is fully contained within the interlace.

11. The UE of claim 1, wherein the interlace is a dedicated interlace for the PSFCH transmission.

12. The UE of claim 1, wherein the interlace is a first interlace, and the PSCCH transmission or the PSSCH transmission includes a resource element of the first interlace, and wherein the set of resource elements further includes a second interlace, and the second interlace does not include a PSFCH content.

13. A method performed by a user equipment (UE), comprising:
receiving, from a second UE through an interface for sidelink communication over a sidelink between the UE and the second UE, a physical sidelink control channel (PSCCH) transmission or a physical sidelink shared channel (PSSCH) transmission;
allocating a set of resource elements within an interlace including multiple resource blocks to carry physical sidelink feedback channel (PSFCH) content associated with the received PSCCH transmission or PSSCH transmission, wherein the set of resource elements includes a first resource element in a first resource block of the interlace, and a second resource element in a second resource block of the interlace, wherein the first resource element is composed of a first symbol of the first resource block, the first resource block further includes a gap symbol adjacent to the first symbol, and the gap symbol is used for Clear Channel Assessment (CCA) of an unlicensed frequency band; and transmitting, to the second UE, the PSFCH content carried by the set of resource elements as a PSFCH transmission to the second UE.

14. The method of claim 13, wherein the first resource element is composed of the first symbol of the first resource block, and the set of resource elements further includes a third resource element of the first resource block, and the third resource element is composed of a second symbol adjacent to the first symbol.

15. The method of claim 13, wherein the second resource element in the second resource block is obtained by performing a cyclic shift of the first resource element in the first resource block.

16. A non-transitory computer-readable medium storing instructions that, when executed by a processor of a user equipment (UE), cause the UE to perform operations, the operations comprising:

receiving, from a second UE through an interface for sidelink communication over a sidelink between the UE and the second UE, a physical sidelink control channel (PSCCH) transmission or a physical sidelink shared channel (PSSCH) transmission;

allocating a set of resource elements within an interlace including multiple resource blocks to carry physical sidelink feedback channel (PSFCH) content associated with the received PSCCH transmission or PSSCH transmission, wherein the set of resource elements includes a first resource element in a first resource block of the interlace, and a second resource element in a second resource block of the interlace, wherein the first resource element is composed of a first symbol of the first resource block, the first resource block further includes a gap symbol adjacent to the first symbol, and the gap symbol is used for Clear Channel Assessment (CCA) of an unlicensed frequency band; and transmitting, to the second UE, the PSFCH content carried by the set of resource elements as a PSFCH transmission to the second UE.

17. The non-transitory computer-readable medium of claim 16, wherein the first resource element is composed of the first symbol of the first resource block, and the set of resource elements further includes a third resource element of the first resource block, and the third resource element is composed of a second symbol adjacent to the first symbol.

* * * * *